United States Patent [19]

Heuchert et al.

[11] Patent Number: 5,716,560
[45] Date of Patent: Feb. 10, 1998

[54] GAS ASSISTED INJECTION MOLDING COMBINING INTERNAL AND EXTERNAL GAS PRESSURES

[75] Inventors: John Michael Heuchert, Macomb, Mich.; James Watson Hendry, Brooksville, Fla.

[73] Assignee: ICP Systems, Inc., Centerline, Mich.

[21] Appl. No.: 528,540

[22] Filed: Sep. 14, 1995

[51] Int. Cl.$^6$ ..................................... B29C 45/57
[52] U.S. Cl. .................. 264/37; 264/572; 425/130
[58] Field of Search ................ 264/572, 37; 425/130

[56] References Cited

U.S. PATENT DOCUMENTS

| | | |
|---|---|---|
| 2,435,610 | 2/1948 | Schneider . |
| 2,615,229 | 10/1952 | Blackburn et al. . |
| 3,044,118 | 7/1962 | Bernhardt et al. . |
| 3,329,198 | 7/1967 | Manning et al. . |
| 3,345,687 | 10/1967 | Marx . |
| 3,906,066 | 9/1975 | Barrie . |
| 4,096,218 | 6/1978 | Yasuike et al. . |
| 4,101,617 | 7/1978 | Friederich . |
| 4,129,635 | 12/1978 | Yasuike et al. . |
| 4,131,665 | 12/1978 | Bodson et al. . |
| 4,140,672 | 2/1979 | Kataoka . |
| 4,164,523 | 8/1979 | Hanning . |
| 4,201,742 | 5/1980 | Hendry . |
| 4,295,811 | 10/1981 | Sauer . |
| 4,309,380 | 1/1982 | Sauer . |
| 4,389,358 | 6/1983 | Hendry . |
| 4,474,717 | 10/1984 | Hendry . |
| 4,519,763 | 5/1985 | Matsuda et al. . |
| 4,531,703 | 7/1985 | Underwood . |
| 4,740,150 | 4/1988 | Sayer . |
| 4,755,128 | 7/1988 | Alexander et al. . |
| 4,917,594 | 4/1990 | Gellert et al. . |
| 4,923,666 | 5/1990 | Yamazaki et al. . |
| 4,948,547 | 8/1990 | Hendry . |
| 5,054,689 | 10/1991 | Hunerberg et al. . |
| 5,069,858 | 12/1991 | Hendry . |

(List continued on next page.)

FOREIGN PATENT DOCUMENTS

| | | |
|---|---|---|
| 1315088 | 9/1988 | Australia . |
| 0127961 | 12/1984 | European Pat. Off. . |
| 0283207 | 9/1988 | European Pat. Off. . |

(List continued on next page.)

OTHER PUBLICATIONS

Patent Abstracts Of Japan, vol. 4, No. 164 (M–41)(646) 14 Nov. 1980 & JP-A-55 113539 (Asahi Dow K.K.) 2 Sep. 1980.

Patent Abstracts Of Japan, vol. 10, No. 159 (M–486)(2215) 7 Jun. 1986 & JP-A-61012312 (Hashimoto Forming Kogyo K.K.) 20 Jan. 1986.

The Best Of Two Worlds In Plastics Processing. *Machine Design*, vol. 54, No. 28, 9 Dec. 1982, Cleveland, U.S.; D.R. Dreger.

*Primary Examiner*—Catherine Timm
*Attorney, Agent, or Firm*—Harness, Dickey & Pierce

[57] ABSTRACT

A gas assisted injection molding system and method in which quantity of an inert gas is applied both internally and externally to a thermoplastic material introduced into an injection mold cavity during formation of an injection molded part. The system includes first and second mold portions defining a mold cavity. An injection means injects a quantity of a thermoplastic material into the mold cavity to form an injection molded part within the cavity. At least one internal gas inlet is provided for introducing a first quantity of gas into a portion the thermoplastic material to form a gas channel therein. The gas within the gas channel presses the thermoplastic material against a mold parting line defined by the intersection of the mold portions and forms a seal between the mold cavity and the mold parting line. As least one external gas inlet is located within one of the mold portions for introducing a second quantity of pressurized gas into the cavity to hold the thermoplastic material firmly against an inner surface of one of the mold portions. The system and method of the present invention thereby forms an injection molded part having a sink-free appearance side with a Class A finish.

12 Claims, 6 Drawing Sheets

U.S. PATENT DOCUMENTS

| | | | |
|---|---|---|---|
| 5,069,859 | 12/1991 | Loren | 264/572 |
| 5,112,212 | 5/1992 | Akselrud et al. | |
| 5,118,455 | 6/1992 | Loren | |
| 5,162,122 | 11/1992 | Loren | |
| 5,200,127 | 4/1993 | Nelson | |
| 5,238,378 | 8/1993 | Gellert | |
| 5,252,287 | 10/1993 | Fries | |
| 5,273,417 | 12/1993 | Nelson | |
| 5,273,707 | 12/1993 | Carroll | |
| 5,286,184 | 2/1994 | Nakayama | |
| 5,295,801 | 3/1994 | Sugiyama et al. | |
| 5,302,339 | 4/1994 | Baxi et al. | |
| 5,306,134 | 4/1994 | Gill | |
| 5,344,596 | 9/1994 | Hendry | |

FOREIGN PATENT DOCUMENTS

| | | |
|---|---|---|
| 2105498 | 4/1972 | France |
| 50-75247 | 6/1975 | Japan |
| 58-94992 | 6/1983 | Japan |
| 58-94993 | 6/1983 | Japan |
| 58-115253 | 7/1983 | Japan |
| 58-115254 | 7/1983 | Japan |
| 60-8022 | 1/1985 | Japan |
| 61-121915 | 6/1986 | Japan |
| 304141 | 7/1971 | U.S.S.R. |
| 1556170 | 11/1979 | United Kingdom |
| 2122130 | 1/1984 | United Kingdom |
| 2139549 | 11/1984 | United Kingdom |
| WO9006220 | 6/1990 | WIPO |
| WO9301039 | 1/1993 | WIPO |
| WO9314918 | 8/1993 | WIPO |
| WO9314919 | 8/1993 | WIPO |

3
GAS ASSISTED INJECTION MOLDING COMBINING INTERNAL AND EXTERNAL GAS PRESSURES

BACKGROUND OF THE INVENTION

The present invention relates generally to gas assisted injection molding and, more particularly, to a method and apparatus for injection molding in which an inert gas is introduced both internally and externally into a mold cavity containing a flowable thermoplastic material to thereby assist in formation of an injection molded part having a Class A appearance side.

Gas assisted injection molding provides an effective method of producing injection molded parts having a high quality finished appearance. As with conventional injection molds, gas assisted injection molds include both a movable mold portion and a stationary mold portion. The stationary mold portion, when clamped in mating contact with the movable mold portion, defines a mold cavity into which a heated flowable thermoplastic material is injected under pressure. In addition, the mold cavity may have one or more rib sections which form ribs on an underside of the resulting injection molded part. The rib or ribs are of a width substantially thicker than the width of the appearance side, thereby permitting a gas channel to be formed at the base of each rib when an inert gas such as nitrogen is introduced into the cavity between the appearance side of the part and each rib. As the injected thermoplastic material cools, the material shrinkage occurs internally within the hollow gas channel. Thus, the rib section is forced away from the inside surface of each formed gas channel but is held firmly against an inner polished surface of the stationary cavity side by the gas, thereby preventing shrinkage of the cooling material therefrom and thus minimizing the occurrence of sink marks on the molded part appearance side.

However, gas assisted injection molds of the type described above also have associated limitations. While the pressurized gas in the gas cavity holds the plastic firmly against the polished inner mold surface at and around the vicinity of the rib, the gas is incapable of holding plastic in such a manner in mold cavity locations remote from the rib. Therefore, there is a tendency for sink marks and/or shadow marks to form on the appearance side of the part in these locations. Such marks detract from the finish of the appearance side and result in the additional step of the part appearance side having to be painted, thus increasing both part production time and cost.

A second form of conventional gas assisted injection molding is of the type disclosed in U.S. Pat. No. 5,344,596 entitled "Method For Fluid Compression of Injection Molded Plastic Material", assigned to ICP Systems, Inc., assignee of the present application, and which is herein incorporated by reference. The above patent discloses a method of gas assisted injection molding in which movable and stationary portions of a mold, when clamped together by a clamping mechanism, define a mold cavity. A flowable thermoplastic material is injected into the cavity through a nozzle/screw ram configuration. An inert gas is then injected into the cavity through external metal disks located in the movable mold portion. This injected gas is maintained within the cavity by mechanical gas seals and is dispersed along the inner face of the movable mold portion. The dispersed gas forces the thermoplastic material forming the appearance surface of the molded part up against the inner surface of the stationary mold portion. As the volume of the mold cavity is increased, additional pressurized gas is introduced into the mold cavity to maintain the desired pressure upward on the thermoplastic material during cooling and solidification of the molded part, thus maintaining the appearance side of the molded part against the inner surface of the stationary mold portion in a uniform manner, unlike previously described methods of gas assisted injection molding. The finished molded part is thereby formed with a high quality appearance side without the need for formation of gas channel ribs on the underside of the part.

While the gas assisted injection molding method disclosed in the Hendry patent represents an advancement in the art, there is still a need for further improvements. In particular, it would be desirable to further reduce the cost and number of parts associated with known gas assisted injection molding systems and methods while at the same time improving the finish of the molded part appearance side.

SUMMARY OF THE INVENTION

In accordance with the teachings of the present invention, a method and system for gas assisted injection molding with external and internal mold gas inlets is provided for forming an injection molded part having a sink-free, shadow free, strain free molding with a Class A finish. The method and system of the present invention include a mold cavity that is self-sealing to retain gas injected into the cavity without the need for mechanical seals, thereby reducing system cost, reliability and number of parts.

According to a first embodiment of the present invention, in an injection molding apparatus including stationary and movable mold portions that define a mold cavity, and mating means for moving faces of the mold portions into abutting contact with one another, a method is provided for producing an injection molded part having a Class A appearance side. According to the method, a flowable thermoplastic material is introduced into the mold cavity. The first quantity of gas is then introduced into the mold cavity to form a gas channel in the thermoplastic material. This first quantity of gas biases the thermoplastic material against a mold parting line formed at an intersection of the mold portion mating faces so as to form a gas seal between the mold parting line and the mold cavity. Next, a second quantity of pressurized gas is introduced through at least one gas inlet located in one of the mold parts and is uniformly dispersed along an underside of the formed injection molded part so as to hold the formed injection molded part against an inner surface of one of the mold portions. Together, the first and second quantities of gas assist in formation of a Class A appearance side on the molded part.

According to a second embodiment of the present invention, a gas assisted injection mold system is provided. The system includes first and second mold portions defining a mold cavity. The mold portions are selectively movable into cooperating contact with one another. Also, injection means is provided for injecting a quantity of thermoplastic material into the mold cavity to form an injection molded part therein. Further, at least one internal gas inlet is provided for introducing a first quantity of gas into a portion of the injected thermoplastic material to form a gas channel therein. The gas in the gas channel presses the thermoplastic material against a mold parting line defined by the mold portions. Finally, at least one external gas inlet is located within one of the mold portions for introducing a second quantity of pressurized gas into the cavity subsequent to the thermoplastic material being introduced into the cavity. The external and internal gas inlets act to press the thermoplastic material against an inner surface of one of the mold portions to form a Class A appearance side of the molded part subsequent to cooling and shrinkage of the thermoplastic material.

The method and system of the present invention therefore effectively form an injection molded part with a superior quality finished appearance side when compared to like parts formed by conventional gas assisted injection molding methods and systems. Further, the method and system of the present invention minimize the number of parts, and system cost, required to implement the method and system of the present invention.

DETAILED DESCRIPTION OF THE PREFERRED EMBODIMENTS

Figure 1:
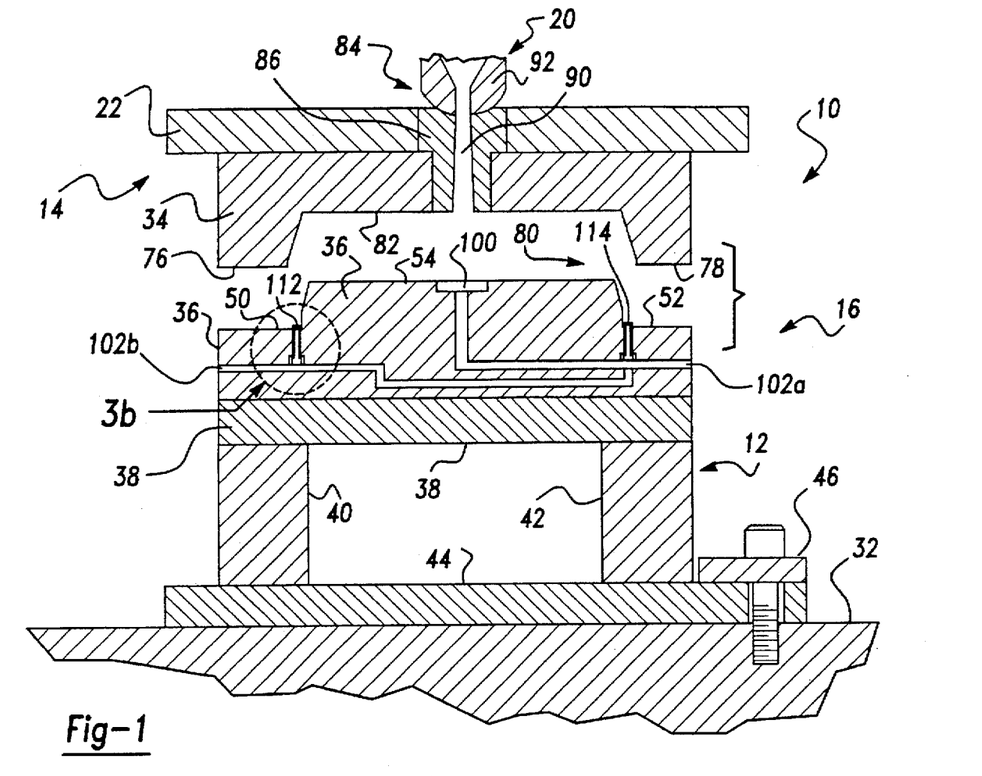
FIG. 1 is a cross-sectional view of a gas assisted injection molding system according to a preferred embodiment of the present invention.

Referring now to the figures, a gas assisted injection molding system according to a preferred embodiment of the present invention is shown generally at 10 in FIG. 1. The system 10 generally includes a movable mold subsystem 12, a stationary mold subsystem 14, a pressurized gas supply subsystem 16, and a thermoplastic supply subsystem 20.

Figure 2:
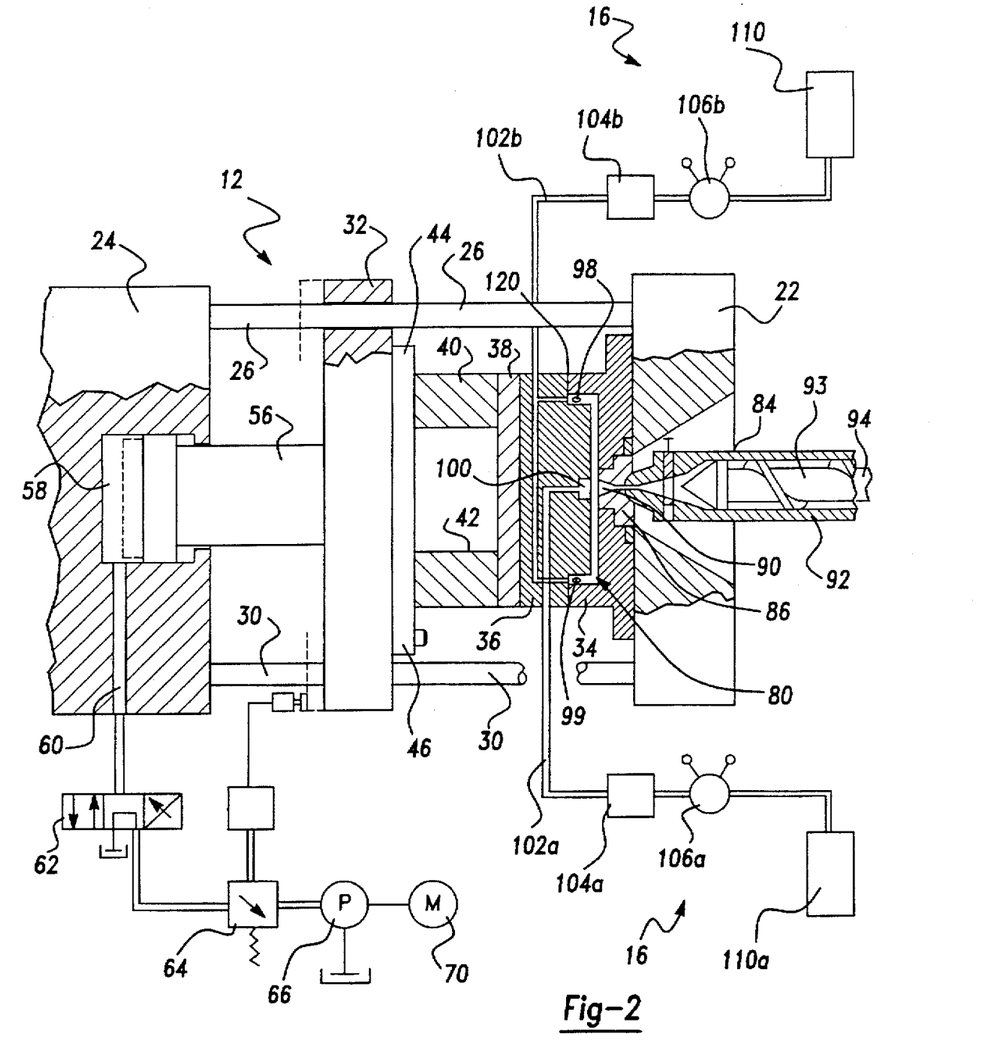
FIG. 2 is a cross-sectional view of the system shown in FIG. 1 showing additional system controls.

Referring to FIGS. 1 and 2, the injection molding system 10 includes stationary platens 22, 24 connected together and maintained in spaced apart relation by axial tie bars 26, 30. A movable platen 32 is coupled to the axial tie bars 26, 30 and is axially movable between the stationary platens 22, 24. In the stationary mold subsystem 14, a stationary mold portion 34 is mounted to the stationary platen 22, while in the movable mold subsystem 12 a movable mold portion 36 is mounted to the movable platen 32 for selective movement into and out of mating contact with the stationary mold portion 34 in a manner described in detail below.

Referring more specifically to the movable mold subsystem 12, the movable mold portion 36 is mounted to a plate 38 which is affixed to mold supports 40, 42. The mold supports 40, 42 in turn are mounted to a mold support plate 44. The mold support plate 44 is in turn affixed to the movable mold platen 32 through a clamping mechanism such as the strap/bolt combination shown generally at 46. The movable mold portion 36 includes mating surfaces 50, 52 that cooperate with the stationary mold portion 34 when the mold portions are moved into abutting contact in a manner described in detail below. The movable mold portion 36 also includes a movable mold portion inner surface 54 described in more detail below.

A hydraulically driven clamping ram 56 selectively controls the movement of the movable mold portion. The hydraulically driven clamping ram 56 is affixed at one end to the movable platen 32 and, at its other end, communicates with a variable volume chamber 58 formed within the stationary platen 24 to drive the movable mold portion 36 into and out of abutting contact with the stationary mold portion 34. The variable volume chamber 58 is connected to a fluid path including a fluid passage 60, a hydraulic fluid directional valve 62, an electronically controlled hydraulic pressure relief valve 64 and a hydraulic pump 66 driven by an electric motor 70. Upon energization, the pressure relief valve 64 releases pressurized fluid into the volume chamber 58 at a particular pressure setting to move the clamping ram 56. The fluid path is identical to that described in U.S. Pat. No. 5,344,596 to Hendry, which has been incorporated by reference into the present application.

Referring specifically to the stationary mold subsystem 14, the stationary mold portion 34 includes mating surfaces 76, 78. The mating surfaces 76, 78 cooperate with the movable mold portion mating surfaces 50, 52, when the mold portions are moved into abutting contact, to define a mold cavity 80 therebetween. An injection molded part is formed when the cavity is filled with thermoplastic material as described below. The stationary mold portion 36 further includes a polished inner surface 82 for defining an appearance side of the injection molded part formed within the cavity.

Referring to the thermoplastic material supply subsystem 20, the stationary platen 22 to which the stationary mold portion is mounted defines an aperture 84. A sprue bushing 86 is nested within the aperture 84 and includes a sprue 90 extending axially through its length. A molding machine nozzle 92 is fitted with the sprue 90 and selectively supplies flowable thermoplastic material to the system 10 through a screw plunger 93, which is in communication with a thermoplastic material supply line 94 extending from a remote thermoplastic supply (not shown). As shown in FIG. 2, the thermoplastic material injected into the mold cavity 80 includes gas channels 98, 99 formed by the gas supply subsystem 16 in a manner described in more detail below.

It should be appreciated that the term "thermoplastic material" is used throughout the specification to reference the material which is supplied through the nozzle 92 to the cavity 80 and which is the material that forms an injection molded part. It should be appreciated that any type of thermoplastic material may be used in the injection molding process of the present invention. For example, general purpose plastics such as polyolefins, polystyrene, ABS resins (such as cycollac, a trade name of General Electric, or krylastic, a trade name of UniRoyal), AS resins, PVC resins, methacrylic resins and fluorine-based resins may be used. In addition, engineering plastics such as nylon, saturated polyester resins, polycarbonate resins, polyacetal resins, polysulfones and modified polyphenylene ether resins may also be used. Further, fiber reinforced resins may also be used in the gas assisted injection molding process of the present invention.

Referring to the gas supply subsystem 16, a sintered metal disk 100 is mounted within the movable mold portion 36 for controllably introducing an inert gas, such as nitrogen, into the interior of the mold cavity 80. Alternatively, a poppet valve or any other type of gas inlet suitable for this particular application may be used. The sintered metal disk 100 is connected to a gas line 102a located in part in the movable mold portion 36. The gas line 102a, which includes a gas directional valve 104a, a high pressure gas reducing valve 106a, and a remote gas supply tank 110a, supplies a quantity of the inert gas, to the system 10 as described in detail below. This gas supply subsystem is identical in structure and function to the gas supply subsystem disclosed in the above referenced Hendry patent. Further, a gas line 102b is connected to gas pins 112, 114 and includes both a gas directional valve 104b and a high pressure gas reducing valve 106b connecting the line to the gas supply tank 110b. Preferably, gas supply tank 110a and 110b are one and the same. The gas line 102b supplies gas to the gas pins as will be described in detail below.

Referring back to the mold cavity 80 shown in FIG. 1, gas pins 112, 114 are operatively located to inject an inert gas internally into the thermoplastic material supplied to the cavity. The gas pins 112, 114 communicate with the inner mold cavity adjacent a mold parting line, which is defined around the periphery of the mold by the intersection of the upper and lower mold portion mating surfaces 50, 76 and the intersection of upper and lower mold portion mating surfaces 52, 78, respectively and is shown in the cross-sectional view in FIG. 2 at 120. The gas pins 112, 114 selectively supply a first quantity of gas from the remote gas supply tank 110b into the mold cavity in a manner described in more detail below.

Figure 3A:
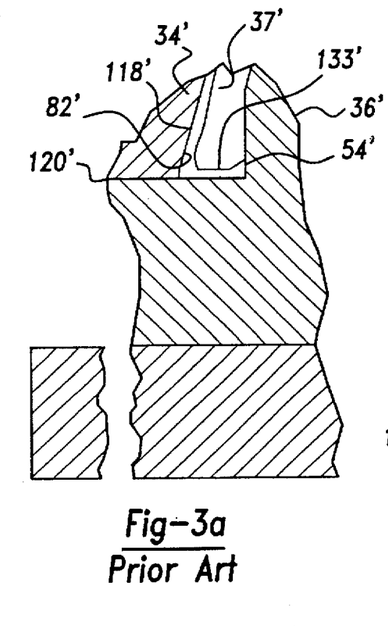
FIG. 3A is a view of a mold parting line of a prior art injection mold system.

FIG. 3A illustrates a mold part line 120' defined at the intersection of upper and lower mold portions 34' and 36' of a conventional injection molding system having only an external gas inlet and no internal gas inlets. Injected thermoplastic material, shown within the mold cavity at 37', shrinks away from both a bottom edge 133' of the cavity and the stationary mold portion inner surface 82' and remains tight against the movable mold portion inner surface 54' as the thermoplastic material cools and forms a molded part. The amount of shrinkage depends upon the type of thermoplastic material and the dimensions of the mold cavity as is well known to those skilled in the art. As the thermoplastic material shrinks, gas introduced into the cavity through an external inlet, such as the inlet 100 shown in FIG. 1, escapes around the bottom edge of the thermoplastic material 37' and through the mold parting line 120'. Cavity pressure thus decreases and the molded part does not remain firmly pressed against the inner surface 82 of the stationary mold portion. As a result of this decrease in pressure, the appearance side of the molded part develops shadow marks and subsequently must be painted or otherwise finished, resulting in added manufacturing cost and time.

Figure 3B:
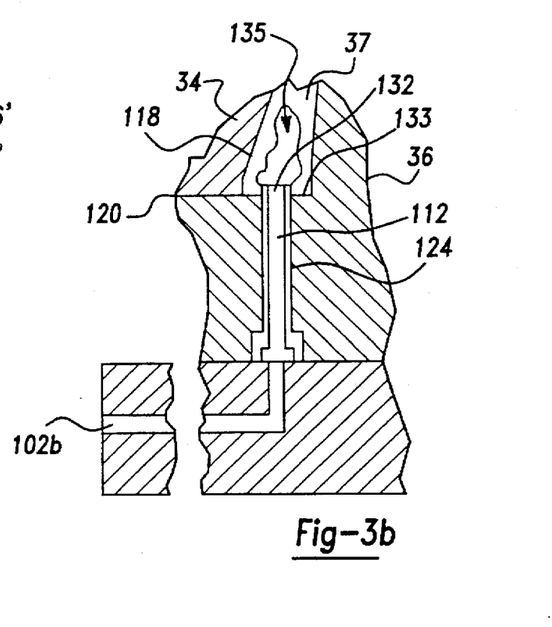
FIG. 3B is an enlarged view of the system area designated in FIG. 1 within circle A.

FIG. 3B is an enlarged view of the area of the movable mold portion 36 shown within the area defined by the dotted circle A in FIG. 1 in which the gas pin 112 is located adjacent a corresponding recess 118 defined by the stationary mold portion 34. It should be understood that the structure and operation of the gas pin 114 is identical to that of the gas pin 112 shown in FIG. 2. The gas pin 112 is fitted within a gas pin sleeve 124 formed within the movable mold portion 36. Preferably, the gas pin has a diameter of 0.125–0.187 inches, while the sleeve has a diameter of 0.187–0.250 inches. The sleeve is designed to have a larger diameter than the pin to allow gas to be both injected into and vented from the mold cavity 80. The gas pin 112 includes an inlet end 132 that protrudes into the mold cavity 80 in close proximity with the mold portion recess 118 and the defined mold parting line 120. The gas pin 112 protrudes into the mold cavity a predetermined distance dependent upon the particular application and dependent upon the thickness of the injection molded part in the particular location of the gas pin. The gas pins 112, 114 are connected to a second gas line 102b which extends within the movable mold portion 36 to the remote gas supply tank 110b. Preferably, the combination of the gas pin 112 and the gas pin sleeve 124 is a standard Detroit Mold Engineering modified commercially available system. As will be described below, gas injected internally through the gas pin 112 prevents the gas introduced externally into the cavity through the inlet 100 from escaping through the mold parting line 120, as the thermoplastic material 37 shrinks around a gas channel 135 formed within the thermoplastic material and not away from the cavity edge 133.

Figures 4, 5:
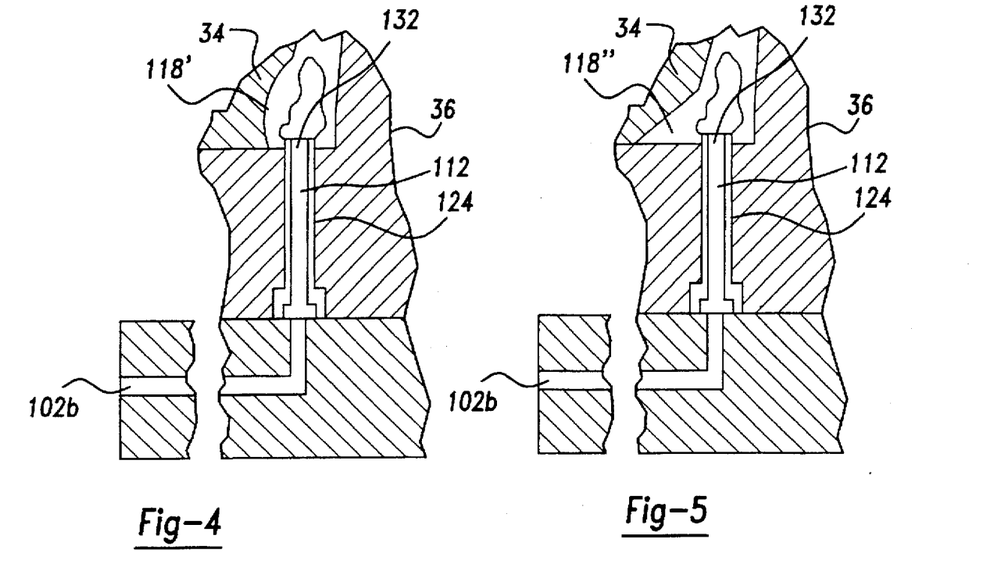
FIG. 4 is a second alternative enlarged view of the system area designated in FIG. 1 within circle A.
FIG. 5 is a third alternative enlarged view of the system area designated in FIG. 1 within circle A.

FIGS. 4 and 5 show alternative mold cavity configurations corresponding to the gas pin inlet end 132. As shown in FIG. 4, the end of the mold cavity corresponding to the inlet end 132 is defined by a semicircular mold portion recess 118' in the stationary mold cavity 34. As shown in FIG. 5, a triangular-shaped mold portion recess 118" is formed adjacent the inlet end 132 of the gas pin 112 in the stationary mold portion 34. The mold portion recesses 118' and 118" may be formed in the stationary mold portion 34 to increase the cavity width at 118' and 118" to allow effective formation of a gas channel within the cavity, and to thereby facilitate formation of an effective gas seal between the mold parting line 120, 122 and the mold cavity 80, respectively.

Referring to FIGS. 1–5, a preferred method of operation of the gas assisted injection mold system 10 will now be described in more detail. The injection molding system movable mold portion 36 is moved in a left to right direction in response to system controls to engage the mating surfaces 50, 52 of the movable mold portion 34 with the mating surfaces 76, 78 of the stationary mold portion 36. The stationary and movable mold portions are then held in abutting contact by the clamping ram 56. In this position, the movable mold portion inner surface 54, the stationary mold portion inner surface 82 and the mold parting line 120 define the mold cavity 80.

Subsequent to the clamping of the stationary mold portion 34 to the movable mold portion 36, a pressurized flowable thermoplastic material is input into the mold cavity 80 through the nozzle 92. Preferably, enough thermoplastic material is supplied to fill between 90% and 100% of the volume of the cavity, thereby leaving a predetermined volume of the cavity unfilled for receipt of injected pressurized gas as will be described in detail below. However, thermoplastic material may be supplied to fill less than 90% of the cavity, depending upon the particular application. When the cavity has been filled with a predetermined amount of thermoplastic material, the nozzle 92, through controls associated with the remote thermoplastic supply (not shown), is closed.

Immediately after the plastic injection is completed, or after a predetermined time delay, valves 104b and 106b are energized, allowing a first quantity of pressurized gas from the gas supply 110b to pass through gas line 102b, through the gas pins 112, 114, and into the mold cavity 80. As the gas enters the mold cavity 80 through the gas pins 112, 114, the highly pressurized gas, which is pressurized preferably between 500 and 10,000 psi, forms gas channels 98, 99 within the thermoplastic material around the periphery of the mold cavity. The pressurized gas in the gas channels 98, 99 holds the still heated, flowable thermoplastic material firmly against the stationary mold portion inner surface 82 adjacent the recess 118. As such, the thermoplastic material held firmly against the inner surface 82 at 118 serves a dual function. First, the appearance side of the injection molded part at location 118 is formed with a Class A finish having no sink marks or shadow marks. Second, the pressurized gas within the gas channels 98, 99 pushes the shrinking plastic against the intersection of mold portion inner surfaces 54, 82 and the side of the mold that is cut away in FIG. 3B (or, alternatively, FIG. 4 or FIG. 5) to reveal the inner components thereof, thereby effectively forming a gas seal at 118 (alternatively, 118' or 118'). This gas seal thereby prevents gas injected through the sintered metal disks 100 from escaping from between the mold parting line 120 defined by the intersection of the mating surfaces 50, 76 and the intersection of the mating surfaces 52, 78. Thus, it should be understood that the gas channels eliminate the need for mechanical gas seals, thereby reducing system cost and system parts (i.e., eliminating the need for mechanical seals) and minimizing system downtime due to incorrect seating of gas seals at the mold parting line 120.

Subsequent to the injection of the gas through gas pins 112, 114 into the mold cavity 80, a second quantity of gas is introduced into the cavity through the sintered metal disk 100. Alternatively, this second quantity of gas may be introduced before the first quantity of gas. The gas entering the cavity through the external sintered metal disk is pressurized so that it becomes evenly distributed with no drop in pressure within the cavity between the movable mold portion inner surface 54 and the thermoplastic material within the cavity. Therefore, the externally applied second quantity of gas presses the thermoplastic material firmly against the polished stationary mold portion inner surface 82. As the externally applied second quantity of gas disperses along the underside of the injection molded part within the mold cavity, the gas is prevented from escaping at the intersection of the mold portion mating surfaces due to the gas seal formed at 118 by the pressurized gas within the gas channels 98, 99. Thus, through the application of an inert gas both internally through the pins 112, 114 and externally through the sintered metal disk 100 into the thermoplastic material within the mold cavity, the entire appearance side of the injection molded part is pressed firmly against the stationary mold portion inner surface 82, thereby preventing formation of sink marks or shadow marks on the appearance side due to thermoplastic material shrinkage during cooling.

Subsequent to its formation, the injection molded part cools for a predetermined amount of time within the mold cavity. The specific amount of part cooling time is determined based upon the type and quantity of thermoplastic material used. As the part cools, the first quantity of gas is vented from the gas channels 98, 99 through the sleeves 124, 126. Preferably, the second quantity of gas is not vented but rather is held within the cavity 80 to assist in ejection of the newly-formed part by breaking the part away from the cavity side from the mold subsequent to the cooling of the part, unlike conventional injection molding systems, thereby simplifying removal of the part from the mold cavity and eliminating the possibility of ejection pins damaging the appearance side of the part. Alternatively, the second quantity of gas may be depressurized to a level just slightly above that necessary for effective part ejection before the mold is opened.

It should be appreciated that, in implementing the system and method of the present invention, system variables such as the injected molded thermoplastic material temperature, thermoplastic material injection pressure, thermoplastic material rate of injection, first and second injected gas quantities, first and second gas pressures, first and second gas rates of injection and mold cooling time will vary with the particular type of thermoplastic material being used in the particular shape and size of the mold cavity. For example, the plastic molding temperature for an ABS resin is preferably about 460°, while the plastic molding temperature for a polycarbonate resin is about 520°. Similarly, first and second gas pressures may range from 500 to 8000 psi depending upon the type of thermoplastic material used. For example, use of a relatively soft thermoplastic material such as an olefin does not require a high gas pressure while a harder material such as Xenoy would require a much higher gas pressure.

Figure 6:
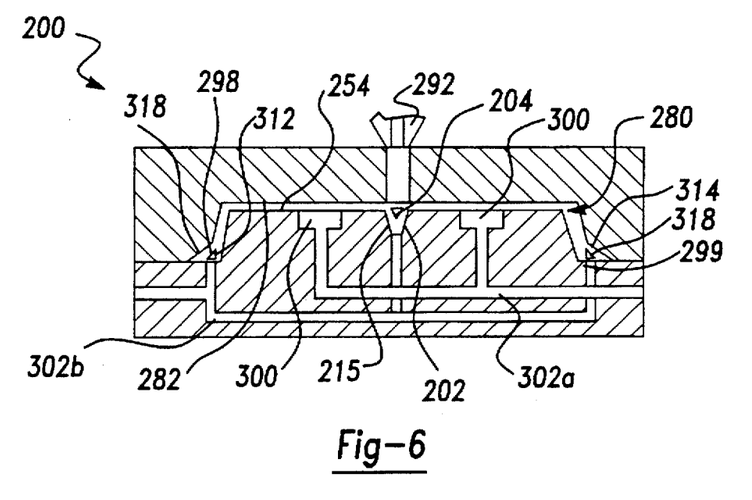
FIG. 6 is a cross-sectional view of a second preferred embodiment of the injection molding system of the present invention.

FIG. 6 illustrates a gas assisted injection mold system generally at 200. The mold system 200 is identical to the mold system 10, with the addition of a remote mold cavity section 202 for formation of a rib on the underside of an injection molded part formed within the mold cavity 280. Also, an additional gas pin 215 is provided to introduce gas into the remote mold cavity section 202 subsequent to the thermoplastic material being introduced into the cavity 280 to thereby form a gas channel 204 throughout the length of the rib. Gas is supplied to the gas pin 215 through the gas line 302b, which is in turn connected to a remote gas supply tank (not shown). Also, an additional sintered metal disk 300 is utilized to introduce gas supplied from gas line 302a into the cavity. The additional sintered metal disk is required due to the fact the remote cavity section 202 of the mold divides the cavity into two isolated sections. A sintered metal disk is required on each side of the remote cavity section 202 to ensure that the thermoplastic material in each of the isolated sections is pressed firmly against the inner surface 282 of the stationary mold portion 234. All other aspects of the structure and operation of the system 210 are identical to those as set forth in conjunction with the system 10 as previously described.

Figure 7:
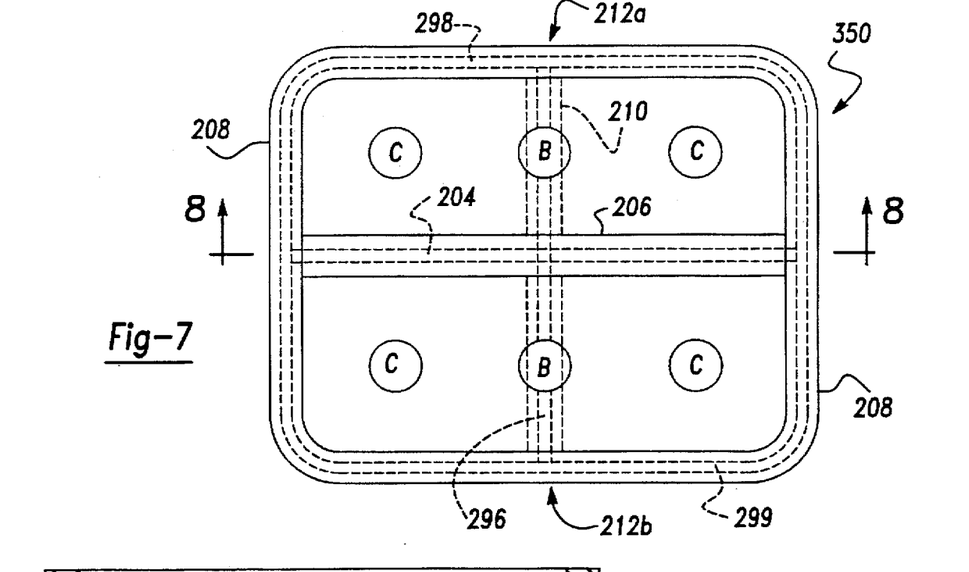
FIG. 7 is a bottom plan view of an injection molded part formed by the injection molding system shown in FIG. 6.

FIG. 7 illustrates the underside of an injection molded part 350 formed by the gas assisted injection mold shown in FIG. 6. As shown, the part includes a rib 206 formed by the remote cavity section 202. The rib 206 includes the gas channel 204 as indicated in phantom. A wall 208, which extends around the periphery of the underside of the molded part, includes the gas channels 298, 299 shown in phantom. Further, a second rib 210, shown in phantom along the underside of the part, includes a gas channel 296. The second rib 210 and its corresponding gas channel 296 could be formed by the gas assisted injection mold shown in FIG. 6 through the formation of another remote mold section in the movable mold portion and through implementation of gas pins or other like internal gas inlet means in communication with the remote mold section at a location in the movable mold portion corresponding to the ends 212a, 212b of the rib 210.

Figure 8:
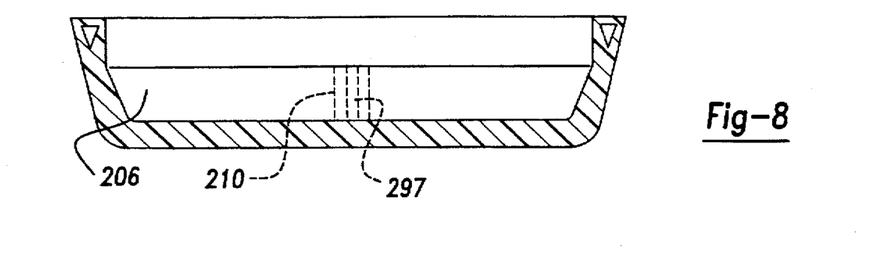
FIG. 8 is a side cross-sectional view of the injection molded part shown in FIG. 7.

FIG. 8 shows a side cross-sectional view taken along line 8—8 in FIG. 7 of the injection mold part 350 formed by the injection mold system shown in FIG. 6. As shown, the injection mold part 350 is formed with gas channels 298, 299 and with the ribs 206, 210. Alternatively, the gas assisted injection molding system and method of the present invention shown at 10 in FIGS. 1–2 is capable of forming the part 350 without the ribs 206, 210 while still producing a resulting Class A appearance side 212.

It should thus be appreciated at this point that the injection molded part 350 may be formed to include ribs, bosses, ribs and bosses or neither ribs nor bosses on the molded part underside. Sintered metal disks, such as those shown at 300 in FIG. 6, are implemented to distribute gas along the part underside in accordance with the rib/boss configuration of the particular injection molded part. Preferably, one sintered metal disk is implemented in each part underside area isolated by a part rib or corresponding to each boss. For example, referring to FIG. 7, if it was only desired to form the rib 206 on the part underside, requisite sintered metal disks would be implemented in the movable mold portion corresponding to the locations on the part underside indicated by the letters B on either side of the rib 206. However, if both ribs 206 and 210 were formed along the part underside, sintered metal disks would be implemented in the movable mold portion corresponding to the locations indicated by the letters C in FIG. 7 to press the thermoplastic material in the rib-isolated areas firmly against the movable mold portion underside 282 to ensure formation of a sink-free appearance side corresponding thereto.

Figure 9:
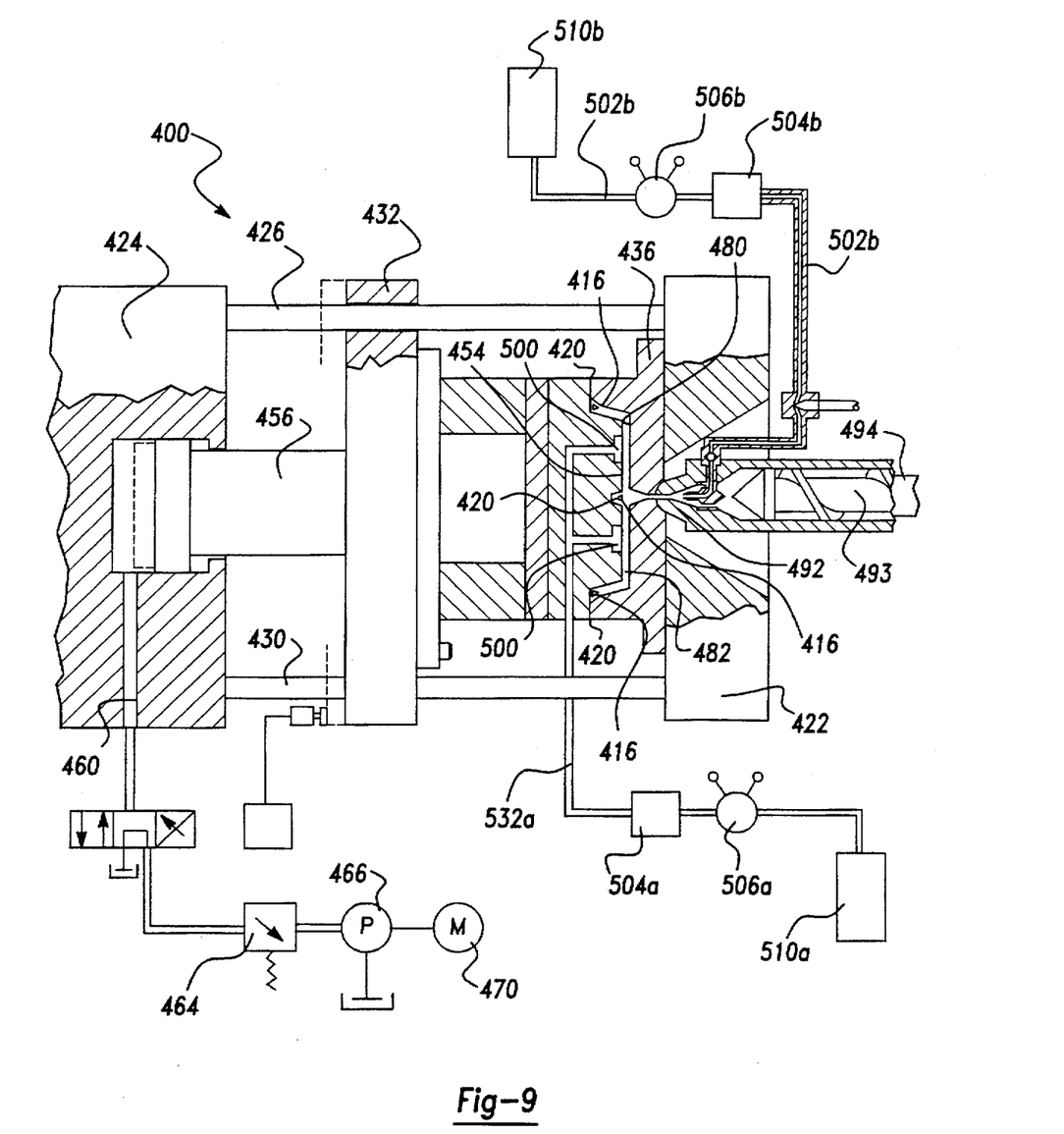
FIG. 9 is a cross-sectional view of a third preferred embodiment of the injection molding system of the present invention.
Figure 10:
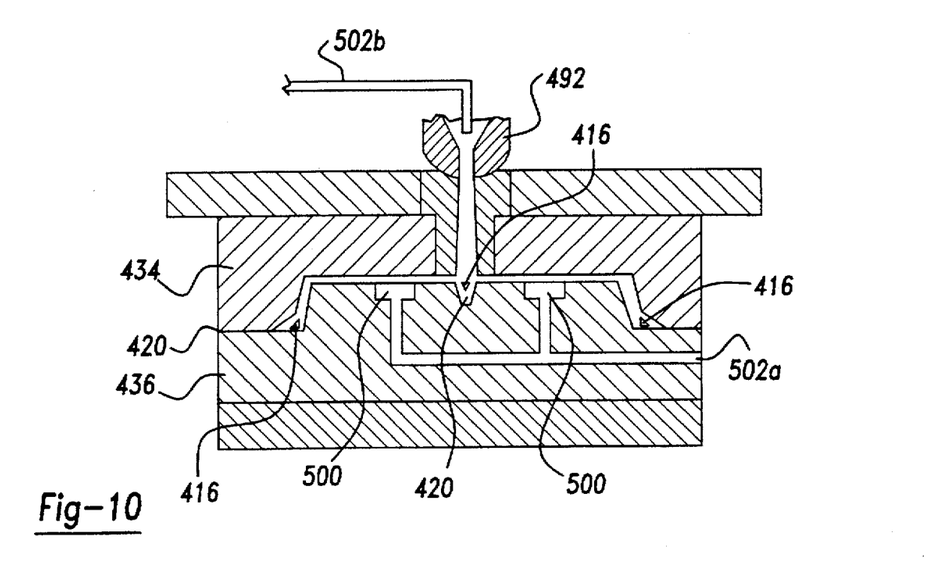
FIG. 10 is a side cross-sectional view of the system shown in FIG. 9.

FIGS. 9 and 10 illustrate yet another embodiment of the gas assisted injection molding system generally at 400. The system is similar to the system shown in FIGS. 1 and 2, with the exception being that gas is injected through the system nozzle 492 rather than through gas pins, such as pins 112, 114, located in remote cavity sections. Gas injected through the nozzle 492 forms a gas channel around the periphery of the molded part to effectively create a gas seal between the mold cavity and the mold parting line 420. A gas line 502b is connected to the nozzle 492 and also to a gas supply tank 510b through a directional valve 504b and a pressure valve 506b. Gas is selectively supplied through the gas line 502b through the nozzle 492 and is injected into the cavity, thereby forming a gas channel 416. The gas channel extends through a gas channel rib 418 formed in a remote cavity section 420, down through the cavity 480 and around the circumference of the mold cavity 480 as shown. Sintered metal disks 500 are connected to a gas line 502a and supply gas externally to the mold cavity to press injected thermoplastic material up against polished inner surface 482 of the stationary mold portion 436. The gas input through the nozzle 492 thus effectively forms a gas seal around the periphery of the cavity 480 similar to the gas seals formed by the gas pins 112, 114 of the earlier described embodiment of the present invention. The remaining structure and function of the system 400 is essentially identical to the system 10.

Figure 11:
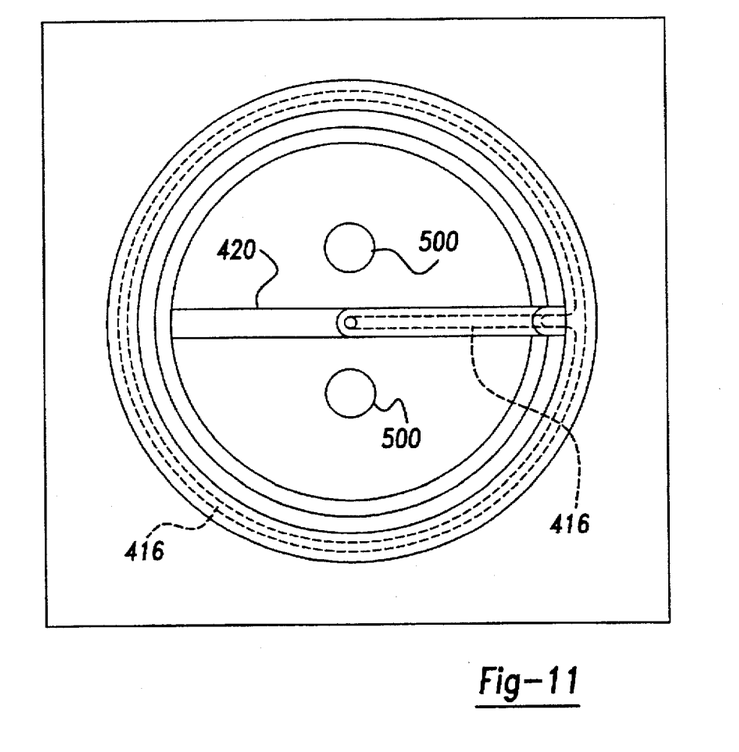
FIG. 11 is a top plan view of the injection molding system of FIGS. 9–10 with the top mold portion removed.

FIG. 11 illustrates a top plan view of the mold cavity 480 showing the gas channel rib 418 with the corresponding gas channel 416. FIG. 11 is included to emphasize that the gas assisted injection molding system and method of the present invention can be configured to form injection molded parts in a myriad of shapes and sizes through minor design alterations to the system. The same principles apply regardless of the desired shape or size of the injection molded part.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. In an injection molding apparatus including stationary and movable mold portions defining a mold cavity, and mating means for moving mating faces of said mold portions into abutting contact with one another, a method for producing an injection molded part having a sink-free appearance side, comprising the steps of:

introducing a flowable thermoplastic material into said mold cavity to form an injection molded part;

introducing a first quantity of gas into said mold cavity so as to form a gas channel in said thermoplastic material in close proximity to a mold parting line formed at an intersection of said mold portion mating faces, said first quantity of gas biasing said thermoplastic material against said mold parting line to form a gas seal between said mold parting line and said mold cavity;

introducing a second quantity of pressurized gas through at least one gas inlet located in a first of said mold portions, thereby allowing said second quantity of gas to be uniformly dispersed along an underside of said formed injection molded part to hold said formed injection molded part against an inner surface of a second of said mold portions; and containing said second quantity of pressurized gas within said mold cavity via said gas seal as said injection molded part cools to form said injection molded part having a sink-free appearance side.

2. The method of claim 1, further comprising the steps of:

venting said first quantity of gas subsequent to cooling of said injection molded part;

releasing said mold portions from abutting contact with one another; and retaining said second quantity of gas in said cavity between said gas seal and said underside of said formed injection molded part to eject said formed molded part from said mold cavity.

3. The method of claim 2, wherein said step of retaining said second quantity of gas further comprises depressurizing said second quantity of gas to a pressure above that necessary to eject said formed molded part.

4. The method of claim 1, further comprising the step of introducing said first quantity of gas into said mold cavity to form a plurality of gas channels therein.

5. The method of claim 1, further comprising the step of venting said first and second quantities of gases subsequent to cooling of said injection molded part.

6. The method of claim 1, wherein said step of introducing a second quantity of gas precedes said step of introducing a first quantity of gas.

7. In a gas-assisted injection molding method for producing an injection molded part, including the steps of providing a mold having a part defining cavity formed by a stationary mold portion and a movable mold portion, clamping mating faces of said stationary and movable mold portions in abutting contact with one another, and injecting a quantity of a flowable thermoplastic material into said mold cavity under pressure, to form an injection molded part, the improvement comprising the steps of:

introducing a first quantity of gas into said quantity of flowable thermoplastic material at a mold location corresponding to a mold parting line defined by intersecting mold portions to form a first gas channel therealong, said first quantity of gas in said gas channel pressing said thermoplastic material against said mold parting line to form a gas seal between said mold parting line and said mold cavity;

introducing a second quantity of gas into said cavity along an underside of said molded part, said second quantity of gas being retained within said cavity by said thermoplastic material sealing said mold cavity along said mold parting line; and containing said second quantity of pressurized gas within said mold cavity via said gas seal as said injection molded part cools thereby forming a Class A appearance side on said injection molded part.

8. The method of claim 7, further comprising the steps of:

cooling said formed injection molded part;

venting said first quantity of gas after said injection molded part solidifies upon cooling;

retaining said second quantity of gas in said mold cavity to assist in ejection of said injection molded part from said mold cavity; and venting said second quantity of gas subsequent to ejection of said injection molded part.

9. The method of claim 7, wherein said step of introducing a second quantity of gas precedes said step of introducing a first quantity of gas.

10. The method of claim 7, further comprising the step of recycling said vented first and second quantities of gas for subsequent use in said method.

11. In an injection molding apparatus including stationary and movable mold portions defining a mold cavity, and mating means for moving mating faces of said mold portions into abutting contact with one another, a method for producing an injection molded part having a sink-free appearance side, comprising the steps of:

introducing a flowable thermoplastic material into said mold cavity to form an injection molded part;

introducing a first quantity of gas into said mold cavity so as to form a gas channel in said thermoplastic material, said first quantity of gas biasing said thermoplastic material against a mold parting line formed at an intersection of said mold portion mating faces to form a gas seal between said mold parting line and said mold cavity; and introducing a second quantity of pressurized gas through at least one gas inlet located in a first of said mold portions, thereby allowing said second quantity of gas to be uniformly dispersed along an underside of said formed injection molded part to hold said formed injection molded part against an inner surface of a second of said mold portions;

said step of introducing a second quantity of gas preceding said step of introducing a first quantity of gas.

12. In a gas-assisted injection molding method for producing an injection molded part, including the steps of providing a mold having a part defining cavity formed by a stationary mold portion and a movable mold portion, clamping mating faces of said mold portions in abutting contact with one another, and injecting a quantity of a flowable thermoplastic material into said mold cavity under pressure, to form an injection molded part, the improvement comprising the steps of:

introducing a first quantity of gas into said quantity of flowable thermoplastic material at a mold location corresponding to a mold parting line defined by intersecting mold portions to form a first gas channel therealong, said first quantity of gas in said gas channel pressing said thermoplastic material against said mold parting line to seal said mold cavity; and introducing a second quantity of gas into said cavity along an underside of said molded part, said second quantity of gas being retained within said cavity by said thermoplastic material sealing said mold cavity along said mold parting line;

said step of introducing a second quantity of gas preceding said step of introducing a first quantity of gas.

* * * * *

UNITED STATES PATENT AND TRADEMARK OFFICE
CERTIFICATE OF CORRECTION

PATENT NO.   :   5,716,560
DATED        :   February 10, 1998
INVENTOR(S)  :   Heuchert et al.

It is certified that error appears in the above-identified patent and that said Letters Patent is hereby corrected as shown below:

Column 7, line 14, before "alternatively" please insert --or,--;
Column 7, line 14, the second occurrence of "118'" should be --118"--.

Signed and Sealed this

Seventh Day of July, 1998

*Attest:*

BRUCE LEHMAN

*Attesting Officer*    Commissioner of Patents and Trademarks